March 18, 1969    J. A. ALGEO    3,434,139
FREQUENCY-CONTROLLED SCANNING MONOPULSE ANTENNA
Filed July 15, 1965    Sheet 1 of 5

INVENTOR.
JERRY A. ALGEO
BY Roepm Pitts
ATTORNEY

INVENTOR.
JERRY A. ALGEO

BY Roy M. Pitts

ATTORNEY

United States Patent Office 3,434,139
Patented Mar. 18, 1969

3,434,139
FREQUENCY-CONTROLLED SCANNING MONOPULSE ANTENNA
Jerry A. Algeo, Buena Park, Calif., assignor to North American Rockwell Corporation, a corporation of Delaware
Filed July 15, 1965, Ser. No. 472,236
U.S. Cl. 343—778                9 Claims
Int. Cl. H01q 13/02, 13/00, 3/26

ABSTRACT OF THE DISCLOSURE

A dual plane frequency-scanning, dual plane monopulse antenna. A matrix of radiating elements are arranged in rows and columns, each row being fed by a separate first pair of mutually phase-squinted feedlines. There is also provided a second and third pair of feedlines, the third pair being progressively phase-squinted relative to the second pair, a first and second feedline of each of the second and third feedline pairs being connected to a corresponding first and second feedline, respectively, of each of the first pairs of feedlines.

---

In the utilization of a radar system to obtain information concerning a detected target, the prior art has employed a highly directional antenna (e.g., one having a narrow beamwidth), which antenna is caused to scan through a selected scan angle. By scanning in two mutually orthogonal directions (for example, nodding the antenna through an elevation angle while less rapidly scanning the antenna through an azimuth angle) the two components of the target direction may be determined. One method of causing a radiated beam of radio energy to scan concomitantly in two mutually orthogonal directions is to provide a coplanar matrix of uniformly spaced rows and columns of radiating elements fed in a selected time-phase sequence by sinuous feedline means operatively connected to a source of frequency-scanned radio energy, as described more fully in an article "Doubly Dispersive Frequency Scanning Antenna" by J. Croney at pages 76–8 of the July 1963 issue of Microwave Journal, published by Horizon House, Inc., of Dedham, Mass., and also in U.S. patent application Ser. No. 458,113, filed May 24, 1965, for Scanning Antenna by Sam H. Wong, assignor to North American Rockwell Corporation, assignee of the subject invention. As is well understood in the art, the direction of a detected target is thus detected to within an accuracy which is limited by the beamwidth.

Where it is desired to more accurately determine the direction of a detected target within the beamwidth, then any one of a number of dual-plane monopulse receiver techniques may be employed, such as are described and illustrated at page 7 of "Introduction to Monopulse" by Rhodes, published by McGraw-Hill (1959). By combining the monopulse azimuth and elevation components of the target angle-off-boresight (e.g., position within the beamwidth) with the respective azimuth and elevation component angles of the present direction of the scanned antenna beam pattern, the direction of a detected target may be fully determined, even though the direction of the antenna boresight axis (geometrical center of the antenna beamwidth) is not coincident with the precise direction of the detected target (e.g., off-boresight monopulse data processing); alternatively, the coincidence of the target direction with the boresight direction may be indicated (e.g., on-boresight monopulse data processing).

As the speeds of radar targets to be detected become faster and faster, it is desirable, if not actually necessary, to be able to scan a given solid surveillance angle or cone at more rapid speeds, while retaining the feature of monopulse data processing.

Several means have been contrived for combining frequency-scanning and monopulse modes of operation. However, such monopulse modes have not normally included dual-plane monopulse modes, but have been limited to one plane, only. One means of combining frequency-controlled scanning of a frequency sensitive antenna and monopulse operation for determining the direction of a target, is to concomitantly pulse two different programmed transmitter frequencies from a single common frequency-sensitive lineal array or antenna, each frequency providing a separate transmitted beamwidth, the two beamwidths being separated, or squinted, in angle in the scanning plane of the frequency-scanned antenna by an amount corresponding to the frequency difference maintained between the two programmed transmitter frequencies. Echoes of the transmitted signals reflected, from a detected target, are received by the frequency sensitive antenna; and suitable IF receiver techniques are then employed to provide conventional sum and difference indications of the received signals, as is described more fully in U.S. patent application 348,733, now abandoned filed Mar. 2, 1964, for Radar System by J. C. Canaday and J. C. Hill, assignors to North American Rockwell Corporation, assignee of the subject patent application. Such an arrangement however, requires two pulsed sources of programmed radio frequency energy; and provides monopulse angle information only in the single plane scanned by the scanning antenna.

Another means of combining frequency-controlled scanning of a frequency sensitive antenna and monopulse operation is to employ a plurality of like frequency-sensitive antenna arrays, stacked perpendicularly to the scanning direction and commonly excited by a single source of frequency-scanned radio frequency energy. The arrays being mutually angularly squinted in the stacked direction, adjacent ones of the several stacked lobes thus provided, may be compared by monopulse receiver techniques to measure the target angle-off-boresight in a direction perpendicular to the frequency-controlled scanning direction, as is described more fully in U.S. patent application Ser. No. 450,380, now U.S. Patent No. 3,295,-128 filed Apr. 23, 1965, for Trajectory Measurement Apparatus by J. A. Canaday, J. B. Gaston and J. C. Hill, assignors to North American Rockwell Corporation, assignee of the subject invention. Such an arrangement, however, requires at least two parallel stacked arrays and provides monopulse angle information only in a plane normal to the direction scanned by the two parallel stacked arrays.

The above described patent application Ser. No. 458,113, filed May 28, 1965, by Sam H. Wong teaches the combination of a dual plane phase-squinted monopulse mode and frequency-controlled dual-plane scanning by the use of a plurality of space-phased (or side-by-side) dual-plane scanning elements interconnected by means of a monopulse four-horn feed arrangement.

In all of such prior art arrangements, at least two frequency-dispersive linear arrays have been required to obtain a monopulse mode in conjunction with a frequency-controlled scanning function. None of the prior art has taught obtaining both frequency-controlled scanning and a monopulse mode concomitantly by means of a single common linear array of radiating elements.

By means of the concept of the subject invention, frequency-controlled scanning is combined with a monopulse mode in a common plane or direction angle for a single lineal array of radiating elements.

In a preferred embodiment of the subject invention, there is provided a frequency-controlled scanning monopulse antenna comprising a lineal array of radiating elements fed by two mutually progressively phase-shifted sinuous feedlines. Adjacent elements of the array are spaced apart along one of the feedlines by a waveguide wavelength amount progressively greater than the corresponding spacing along the other of the two feedlines.

In normal operation of the above described arrangement, the two feedlines may be commonly excited by a frequency-scanned source of pulsed energy. The progressively phase-shifted feedline provides a radiated wave front from the array which is angularly squinted or displaced (1) relative to that produced by the cooperation of the other feedlines with the array, and (2) in the plane containing such frequency-sensitive array. Similarly, the antenna pattern response of one of the feedlines to radar echoes received from a detected target, will demonstrate an amplitude sensitive directivity which is angularly squinted relative to that of the other feedline, whereby monopulse receiving techniques may be employed. The on-boresight direction of the combined beamwidths in the plane of such frequency sensitive scanning is a function of the transmitted frequency of the single, frequency-scanned, radio frequency source. Such concept and arrangement are conveniently adapted for use with a matrix of rows and columns of radiating elements, whereby dual-plane frequency-sensitive scanning and a dual-plane monopulse mode may be conveniently combined. Accordingly, it is a broad object of the invention to provide an improved monopulse antenna.

It is another object of the subject invention to provide a monopulse antenna having a frequency-controlled scanning mode.

It is still another object to provide a lineal physical array of radiating elements fed by two mutually phase-squinted feedlines for combining a monopulse mode and a frequency controlled directional scanning mode in such single linear array.

It is yet a further object to provide a radiating matrix of uniformly spaced rows of radiating elements, each row fed by a separate pair of mutually phase-squinted feedlines, forming an antenna having a concomitant dual plane scanning mode and dual plane monopulse mode.

These other objects of the invention will become apparent from the following description, taken together with the accompanying drawings in which.

In the figures, like reference characters refer to like parts.

Figure 1:
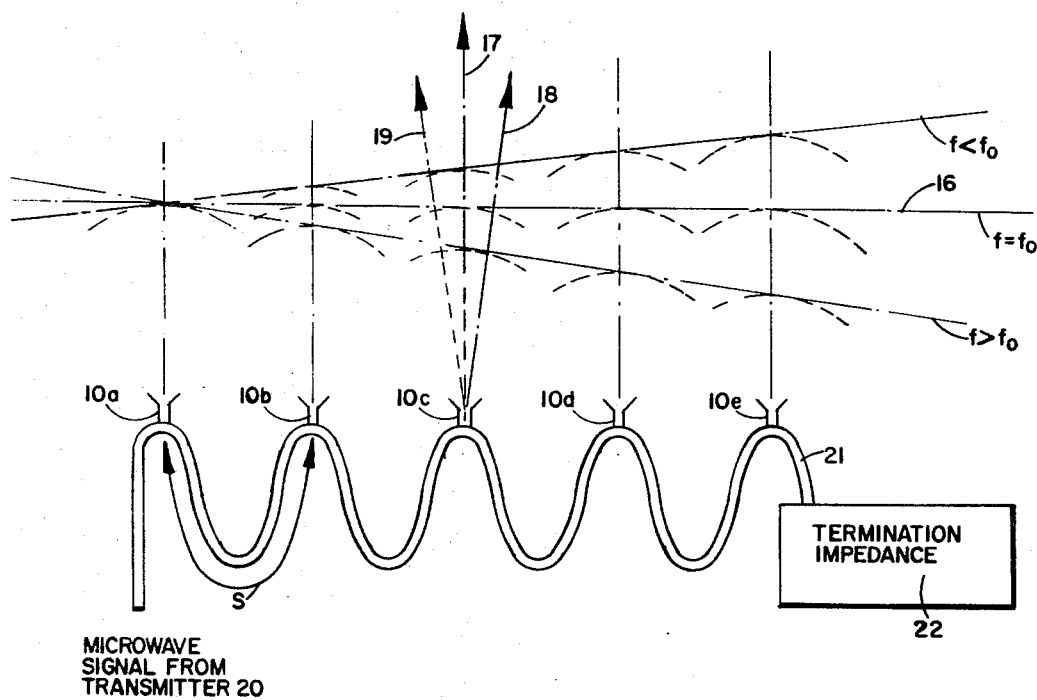
FIG. 1 is a schematic arrangement of a sinuous feedline having a lineal physical array of radiating elements for illustrating the concept of an antenna having a frequency-controlled scanning feature.

The frequency sensitive directional properties of a serpentine array may be more easily appreciated by reference to FIG. 1.

Referring to FIG. 1, there is illustrated schematically a microwave serpentine radiative array, comprising a lineal array of radiating elements 10 commonly connected to a source 20 of radio-frequency (RF) energy-to-be-transmitted by means of a folded microwave feed section 21 referred to as a serpentine feed section, which is terminated into a nonreflective terminating impedance, as is understood in the art. A fixed lineal spacing is employed between successive elements of the array of radiating elements 10, while a fixed relative phase is employed between mutually adjacent feedpoints of the serpentine feed section to each of which a corresponding radiating element 10 is connected in a microwave circuit. Where the fixed relative phase is equal, for example, to an integral number of wavelengths of a selected radio frequency, $f_o$, the energy transmitted from all of the radiating elements will be mutually in phase, thereby describing a planar wave front 16 parallel to the linear array, and travelling perpendicularly thereto. Such perpendicular or broadside direction 17 of propagation occurs only for such frequency $f_o$ for which the relative phase difference S corresponds to an integral number of wavelengths, which frequency is referred to herein as the broadside frequency.

If the frequency of the RF energy is changed, then the direction of the relative phase angle between adjacent ones of successive radiating elements 10 is changed, thereby causing a change of the direction of propagation in the plane of the illustration of FIG. 1. For example, if the transmitted frequency $f$ is increased above the broadside frequency $f_o$, then the relative phase angle between successive radiating elements is correspondingly increased by an incremental amount, whereby each successive element is increasingly delayed relative to that element nearest the RF source (element 20). Thus, for $f>f_o$, the direction 18 of propagation is toward the terminated end of the serpentine feed element 21 (to the right as illustrated in FIG. 1). Similarly, for transmitted frequencies less than the broadside frequency (i.e., $f<f_o$), the direction of propagation 19 is rotated toward the left or the input end of the serpentine feed. Hence, a selected transmitter frequency corresponds to a given (azimuth) direction for the antenna of FIG. 1; and azimuth scanning of the antenna can be achieved by simply progressively changing, or programming, the transmitter frequency.

The construction and arrangements of a serpentine or snake feed array is known in the art, a description of such a device being included in a published article "Survey of Electronically Scanned Antennas" by Harold Shnitkin, at pages 70 and 71 of the December 1960 issue of Microwave Journal, published by Horizon House, Inc., 1330 Beacon St., Brookline, Mass.

The device of FIG. 1 has been described as providing a progressively changed incremental delay between adjacent ones of successive radiating elements 10 at other than broadside frequency, resulting in an angular displacement of the resultant wavefront from a broadside direction. Such angularly squinted effect may also be achieved at the broadside frequency by the use of a physical waveguide wavelength spacing of a progressively increasing amount between adjacent ones of successive radiating elements, as shown in FIG. 2.

Figure 2:
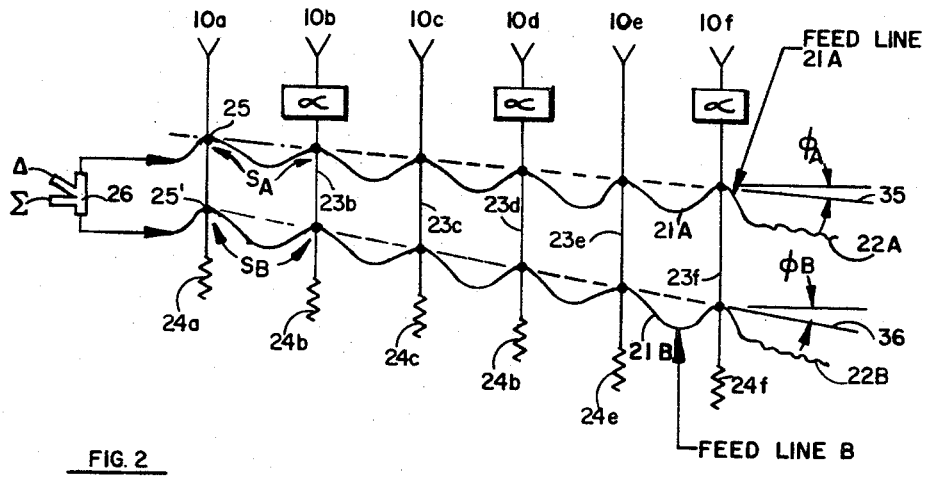
FIG. 2 is a schematic arrangement of a lineal array of radiating elements illustrating one aspect of the invention.

Referring to FIG. 2, there is illustrated a diagram of a lineal array of radiating elements, embodying one aspect of the inventive concept. There is provided a lineal physicay array of uniformly spaced radiating elements 10a, 10b, 10c, 10d, 10e and 10f, each connected to one end of an associated feedhorn section 23, the opposite end of each feedhorn section being terminated by a terminating impedance 24. Each of radiating elements 10 is fed by a first sinuous feedline 21A, through an associated feedhorn section coupled to feedline 21A by means of a directional coupler 25, described more fully hereinafter. A fixed relative phase or uniform phase spacing being employed between mutually adjacent elements fed by feedline 21A, such feedline corresponds to that of FIG. 1. The array of radiating elements 10 is also fed by a second sinuous feedline 21B, each feedpoint thereof being similarly coupled by a directional coupler 25' to the feedhorn section associated with a corresponding radiating element. A progressively increased waveguide wavelength spacing is employed between mutually adjacent ones of successive radiating elements 10 fed by feedline 21B.

If each of feedlines 21A and 21B is separately excited by a single frequency-scanned source of radio frequency energy, applied through a folded magic tee or like broadband power-splitting microwave device 26, each feedline in cooperation with radiating elements 10 will produce a directionally scanned beam pattern which scans in a plane parallel to FIG. 2 and containing the lineal array of elements 10, similarly as the arrangement of FIG. 1. Because of the progressively increased waveguide wavelength spacing between adjacent ones of successive elements 10 in cooperation with feedline 21B, the direction of the directionally scanned beam produced by the cooperation of elements 10 and 21B will be angularly squinted or displaced in the scanning plane (the illustrated plane of FIG. 2) relative to that produced by the cooperation of elements 10 with feedline 21A. In other words, the progressive phase shift of feedline 21B relative to feedline 21A acts to directionally bias the direction of the beam pattern B produced by feedline 21B relative to the direction of the beam A produced by feedline 21A for a like frequency, as shown in FIG. 3.

Figure 3:
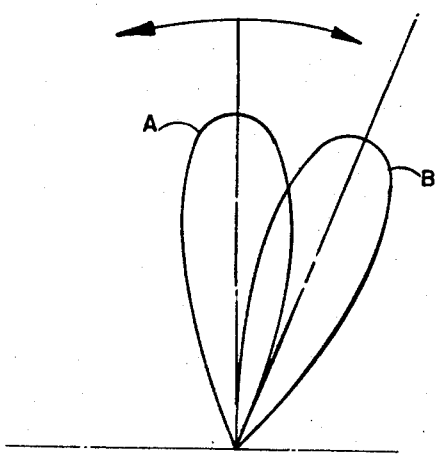
FIG. 3 is a diagram illustrating the mutually angularly squinted dual antenna patterns provided by the arrangement of FIG. 2.
Figure 4:
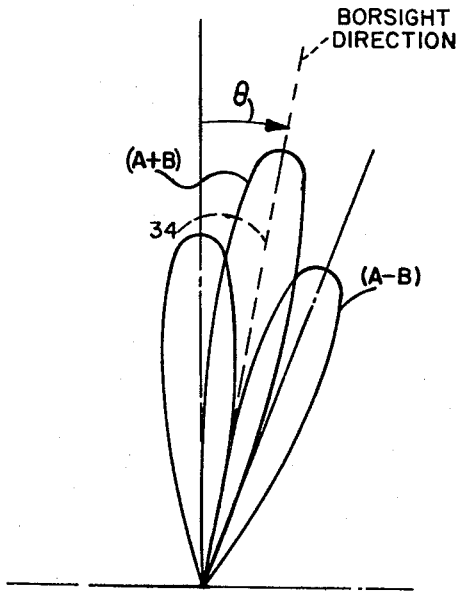
FIG. 4 is a diagram of the sum of and difference between the patterns of FIG. 3.

The relative beam patterns being the same for both reception and transmission, echoes of the transmitted signals, received from a radar target by the arrangement of FIG. 2, may be additively and subtractively combined by means of folded magic tee 26, to provide a monopulse sum and difference pattern corresponding to the sum of and difference between the patterns of FIG. 3, as shown in FIG. 4. Such monopulse signals may then be processed in accordance with well known monopulse receiver techniques to provide a normalized monopulse difference signal having a sense and amplitude of the direction of the detected target relative to the boresight direction 34 of the combined beam pattern $(A+B)$ formed by the two beams A and B, as described more fully at page 57 of "Introduction to Monopulse" by Rhodes, published by McGraw-Hill (1959). Because the direction of the boresight axis (within the scanning plane) is indicated by the transmitted frequency, and the direction of the target relative to the boresight axis (as projected into the scanning plane) is indicated by the normalized monopulse difference receiver signal, the direction of the target lying within the beamwidth of a directionally scanned beam pattern is precisely determined. Hence, the arrangement of FIG. 2 is a frequency-controlled directionally-scanning monopulse antenna comprising a lineal physical array of radiating elements fed by two mutually progressively phase shifted or phase squinted feedlines. Although feedline 21A of FIG. 2 has been described as providing a uniform phase spacing between adjacent ones of successive elements of array 10, the concept of the invention is not so limited, the practice of the invention requiring only that adjacent elements of the array of elements be phase-spaced apart through one feedline by an amount progressively greater than the corresponding phase-spacing through the other of the two feedlines.

Such progressively increased time-delay provided by one feedline 21B relative to the other 21A may be provided, not only by progressively increasing the incremental feedline length (of line 21B) between adjacent ones of successive feedhorn sections 23, but by coupling line 21B at a feedpoint on feedhorn sections 23 at successively increasing distances from an associated radiating aperture 10. In other words, the delay line length of that section of feedhorn 23f between the couplings thereto of feedlines 21A and 21B is greater than the corresponding section of feedhorn 23e, as is indicated by the greater angle $\phi_B$ at which the locus 36 formed by the feedpoints of line 21B deviate from the corresponding angle $\phi_A$ for the locus 35 associated with feedline 21A in FIG. 2. Another means of providing such mutually phase-squinted pair of feedlines in cooperation with a single array is to reduce the waveguide geometry thereof so as to change the relative phase velocity or waveguide wavelength of energy transmitted through one of such feedlines. Further, all three means may be combined for effecting a pair of mutually phase squinted feedlines, as shown in FIGS. 5 and 6.

Figure 5:
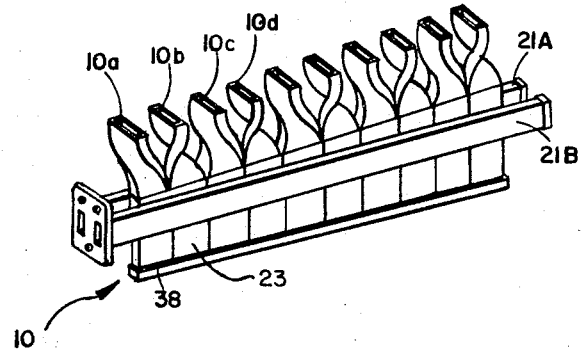
FIGS. 5 and 6 illustrate a preferred embodiment of the device of FIG. 2.

Referring now to FIG. 5, there is illustrated a preferred embodiment of the schematic arrangement of FIG. 2. There is provided a linear array 10 of radiating elements having feedhorn sections 23, and arranged in cooperation with two mutually phase-squinted feedline sections 21A and 21B corresponding to the linear array of FIG. 2. Each of the radiating elements 10 of FIG. 5 has a 90° twist in it, adjacent elements being oppositely twisted, whereby such adjacent radiating elements are additionally mutually phase-shifted in a relative 180° or anti-phase relationship, and corresponds to the phase-shift element α inserted in alternate ones of the radiating elements in the illustrated array of FIG. 2. Accordingly, the waveguide wavelength spacing along a given one of feedlines 21A and 21B for an associated broadside frequency will be an odd integer multiple of waveguide half wavelengths at such frequency, rather than an integer number of waveguide whole wavelengths at such frequency, as is understood in the art. The advantages of such feature will be more fully described hereinafter.

Feedlines 21A and B are brazed to opposite (parallel) sides of the brazed assembly 23 of feedhorn sections in a generally transverse position, the orientation of feedline 21B being mutually angled by an amount $(\theta_A - \theta_B)$ with feedline 21A in a common parallel plane. Each of feedlines 21A and 21B is coupled to each of the feedhorn sections of feedhorn assembly 23 by means of directional couplers 25 and 25' in adjacent faces of each feedhorn and feedline, as shown more particularly in FIG. 6.

Figure 6:
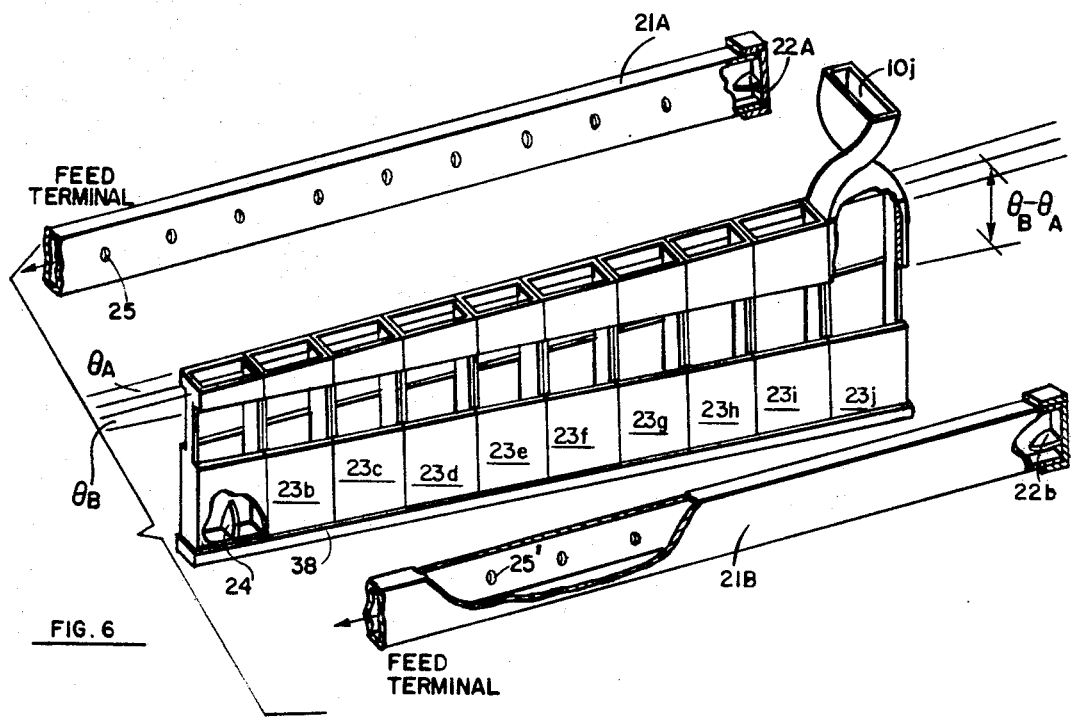

Referring to FIG. 6, there is illustrated an exploded view of a preferred embodiment of the arrangement of FIG. 5. The feedhorn sections 23 associated with the radiating elements 10 are arranged generally mutually parallel, the narrow dimension of adjacent feedhorn sections being contiguous, each feedhorn section having a terminating impedance 24 at that end opposite the radiating aperture 10. Such terminating impedance is generally a tapered dielectric material, a broad dimension of which is seated at the terminated or short-circuit end of feedhorn section 23, as is well understood in the art. Such terminated end may be provided by a flanged shorting bar 38 having a length co-extensive with the length of the array of feedhorns, the flanges of which shorting bar are adapted to fit over and be brazed to the feedhorn array, the terminating impedances 24 being spaced there along in a manner corresponding to the center-to-center spacing of the feedhorn sections. Similar terminating impedances 22A and 22B are also included at the terminated ends of feedlines 21A and 21B.

A portion of a like broadwall of each of feedhorn sections 23 is cut away to accommodate the broadwall dimension of a like one of the feedline sections 21A and 21B, that broadwall of a feedline which is mounted adjacent or abutting the feedhorn section 23 forming a common wall or septum separating the abutting feedhorn section and feedline section. Such cutting away of the like broadwalls of the mutually parallel feedhorn sections 23 provides means for mounting the feedline sections thereto in such an orientation that the feedhorn sections 23 are angled with respect to the two feedlines 21A and 21B, the two feedlines being mutually angled by the amount $(\theta_A - \theta_B)$.

Directional coupling means is provided for coupling each of feedhorn sections 23 to each of feedline sections 21A and 21B, by means of suitably spaced apertures 25 and 25' punched out of the broad wall septum of each of feedline sections 21A and 21B, at intervals corresponding to the center-to-center spacing between adjacent ones of the feedhorn sections 23. The purpose of each such directional coupler is to provide that a travelling wave (of energy to be transmitted) inserted at the open or input terminus of either of feedlines 21A and 21B propagates energy travelling toward the apertures 10 of feedhorn section 23, and that radar echoes or travelling waves received at apertures 10 propagate energy in the feedlines which travels toward such open terminus of the feedlines. A theoretical treatment and explanation of such devices are given in an article "Directive Couplers" by M. Surdin, at pages 725–736, in vol. 93, Part III–A, 1946, of The Journal of the Institution of Electrical Engineers, published by the Institution of Electrical Engineers, Savoy Place, Victoria Embankment, London, W. C. 2, England. Such article describes the advantages obtained by minimizing the thickness of the septum or broadwall separating the two waveguide sections to be coupled, corresponding to the use of a single common broadwall section or septum shown in the arrangement of FIG. 6. Also, a detail design employed in commercially available directional coupling devices is described at page 106 of "The Microwave Engineer's Handbook and Buyer's Guide," 1965 issue, published by Horizon House, Inc., of Dedham, Mass. Because such coupling technique is, therefore, known in the art, no further description thereof is provided herein.

Because of the mutually angled arrangement of the feedline sections 21A and 21B which are both crossed with respect to the feedhorn sections 23, it is to be appreciated that the effective feedlength between adjacent ones of successive radiating apertures 10 and associated with one of the two feedlines, is progressively increased relative to that associated with the other of the two feedlines. Hence, the two feedlines cooperate with the linear array of radiating elements as two mutually phase-squinted feedlines.

Additionally, such mutually phase-squinted relationship between feedlines 21A and 21B may be achieved by providing a different phase velocity characteristic in one feedline relative to the other, in which case, the mutually angled relationship of the feedline pair is not required. Such phase velocity difference may be achieved by changing the broadwall dimension of one feedline relative to that of the other, as is well understood in the art. Further, such two structural features of mutually angling the two feedlines and reducing the broadwall dimension of one relative to the other, may be combined to effect a pair of mutually phase-squinted feedlines.

While the single plane monopulse arrangement of FIGS. 2, 5 and 6 has been described in connection with a single-plane, frequency-controlled scanning antenna application, the concept of the invention is not so limited. By means of a two-dimensional array or matrix of radiating elements, a dual-plane monopulse, frequency-controlled dual-plane scanning function may be provided, as shown in FIG. 7.

Figure 7:
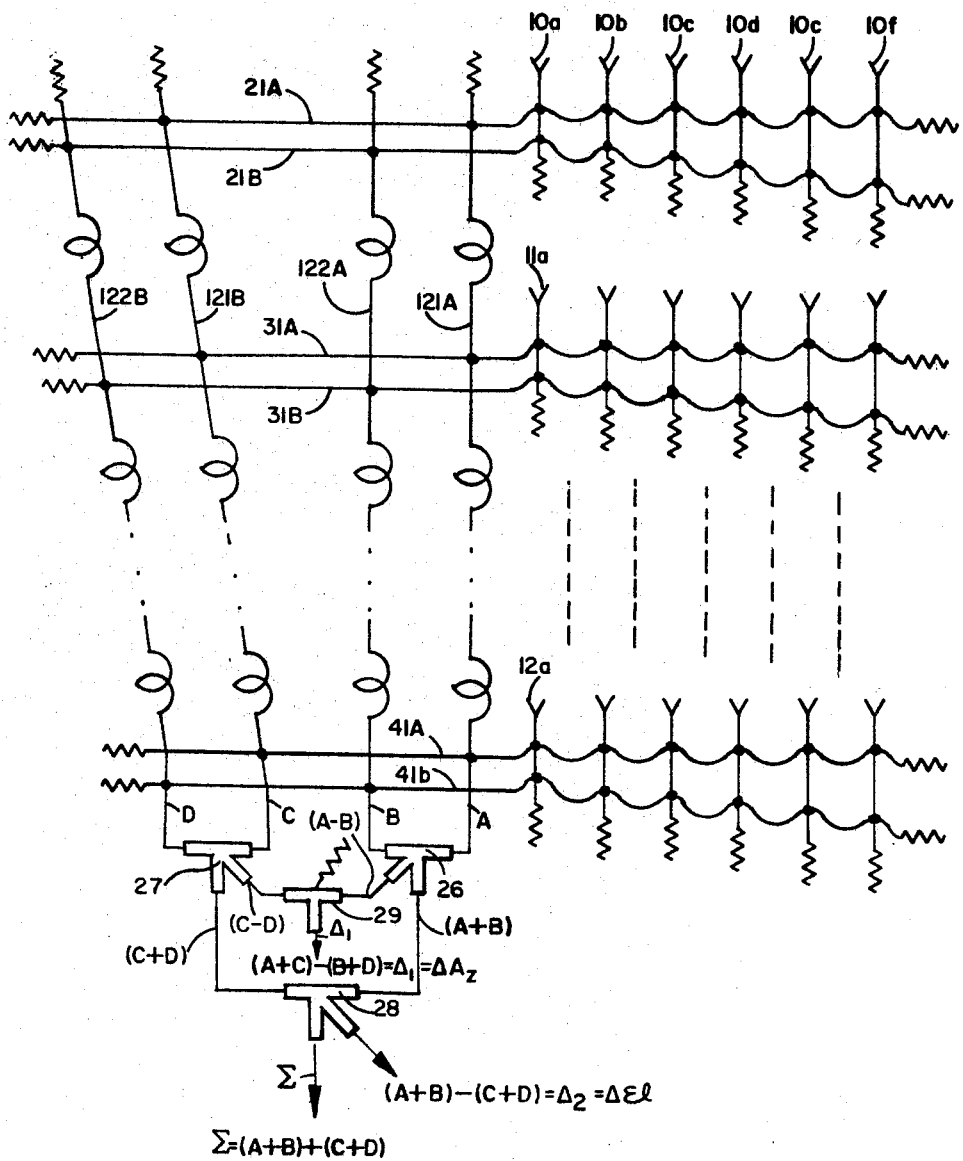
FIG. 7 is a schematic arrangement of a coplanar matrix of radiating elements, illustrating the application of the inventive concept to the combination of dual plane scanning and dual-plane monopulse.

Referring to FIG. 7, there is illustrated a schematic arrangement of a coplanar matrix of radiating elements, applying the concept of the invention to the combination of dual plane-scanning and dual-plane monopulse. The coplanar matrix is comprised of uniformly-spaced rows and columns of radiating elements. Each row of elements is designated by a progression of alphabetic reference characters, corresponding to the dual-fed linear arrays of FIG. 2. For example, the top row is comprised of radiating elements 10a, 10b, 10c, 10d, 10e and 10f. Each column of elements is indicated by a progression of numeric reference characters, the left column or vertical array of FIG. 7 comprising radiating elements 10a, 11a and 12a.

There is also provided a like number of first pairs of mutually progressively phase-squinted feedlines as rows, each pair of feedlines being connected to feed a mutually exclusive one of the rows of radiating elements. For example, feedline pair 21A and 21B are connected to feed row 10, feedline pair 31A and 31B feed row 11, and pair 41A and 41B feed row 12, each set of a first pair of feedlines and associated row or linear array of elements being constructed and arranged to cooperate in the manner of the corresponding elements of FIG. 2.

There is further provided a second and third pair of feedlines, the third pair 121B and 122B being progressively phase squinted relative to the second pair 121A and 122A, respective first feedline 121A and 121B of each of the second and third pairs of feedlines being connected to a corresponding or first feedline 21A, 31A and 41A of each of the first pairs of feedlines. A respective second feedline 122A and 122B of each of the second and third pairs of feedlines is connected to the second feedline 21B, 31B and 41B of each of the first pairs of feedlines. The second and third pairs of feedlines 121A, 122A, 121B and 122B are normally constructed to provide longer delays between adjacent feedpoints, or greater phase-versus-frequency dispersion, than those provided by feedlines 21A, 21B, 31A, 31B, 41A and 41B, as may be provided by a helix type microwave feedline.

As will be more fully explained hereinafter, the feed terminals of the connected feedlines 121A, 122A, 121B and 122B comprise respective terminals A, B, C and D terminals corresponding to the four feedhorns of a dual-plane monopulse antenna. A first sum-and-difference means, such as a broadband folded magic tee 26 is operatively connected to terminals A and B of feedlines 121A and 122A and a second magic tee 27 is operatively connected to terminals C and D of feedlines 121B and 122B. A third magic tee 28 is operatively connected to the sum channel outputs of the first and second magic tees to provide a combined monopulse sum signal $(A+B+C+D)$ and a first composite monopulse difference signal $(A+B)-(C+D)$.

Additional signal summing means 29 is responsively coupled to the difference channel outputs of first and second magic tees 26 and 27 to provide a second composite monopulse difference signal, $(A+C)-(B+D)$.

The respective difference channel output $(A-B)$ and $(C-D)$ of a respective one of first and second magic tees 26 and 27, is seen to provide a combined monopulse difference signal representing the difference between the mutually phase-squinted first pairs of feedlines, such as for example, feedline pair 41A and 41B. Such difference signal represents an azimuth monopulse difference signal (for the arrangement as illustrated in FIG. 7), and corresponds to that provided by the arrangement of FIG. 2. Hence, the sum of such outputs, $(A+C)-(B+D)$, provided by fourth magic tee 29, represents a composite azimuth monopulse difference signal, $\Delta A_z$:

$$(A-B)+(C-D)=(A+C)-(B+D)=\Delta A_z \quad (1)$$

Mutually phase-squinted feedline pair 121A and 121B and mutually phase-squinted feedline pair 122A and 122B each cooperate with each columnar array of elements (such as, for example, first column 10a, 11a and 12a) to provide a pair of vertically angularly squinted beams, whereby the difference $(A-C)$ between mutually phase-squinted feedlines 121A and 121B and the difference $(B-D)$ between mutually phase-squinted feedlines 122A and 122B represent elevation monopulse difference signals. In other words, the difference $(A+B)-(C+D)$, between the signal $(A+B)$ from tee 26 (provided by the non-phase squinted feedlines 121A and 122A) and the signal $(C+D)$ from tee 27 (provided by feedlines 121B and 122B which are commonly phase-squinted relative to feedlines 121A and 122A), and occurring at the difference channel output of tee 28, is a composite elevation monopulse difference signal, $\Delta El$:

$$(A-C)+(B-D)=(A+B)-(C+D)=\Delta El \quad (2)$$

The normal operation of the arrangement of FIG. 7 in a monopulse radar system application, a pulsed source frequency-scanned radio energy would be applied to the sum ($\Sigma$) channel terminal of element 28, thereby exciting all four feedline terminals A, B, C and D in phase. The sensitive direction of the boresight axis of the combined directional beam pattern provided by the combination or matrix of radiating elements is determined by the frequency of the applied radio frequency energy. As the frequency is scanned or cyclically varied, the direction of the beam is varied, both in azimuth and in elevation (e.g., horizontally and vertically, for the illustrated arrangement of FIG. 7), due to the double frequency dispersive effect obtained. The increased frequency dispersive effective provided in elevation by helix feedlines 121A, 121B, 122A and 122B in cooperation with the columnar arrays of radiating elements causes a much faster directional scan in elevation than that provided in azimuth by the combination of horizontal arrays or rows of elements. Hence, the transmitted frequency provided by a scanned frequency source of radio frequency energy is indicative of both the elevation and azimuth components of the direction angle of the boresight axis of the radiated beam, while the monopulse outputs of magic tees 28 and 29 may be employed to determine both the elevation and azimuth components of the reflected echoes of such energy from a detected target within the beamwidth and relative to the boresight axis. In this way, the precise direction or target angle of a detected target may be determined.

Referring again to FIGS 2, 5 and 6, it was previously noted that phase shifting means may be included for effecting an additional 180° mutual phase shift or incremental anti-phase relation between adjacent radiating elements of a given linear array of radiating elements. The purpose of such additional structural feature is to increase the utilization of a given spectra of frequencies which includes two or more broadside frequencies, and to provide certain economies in fabrication.

The resulting scan angle $\theta$ for a given wavelength $\lambda$, produced by the exemplary frequency-sensitive array of FIG. 1, is given by the following well known relationship which is taught, for example, in U.S. Patent No. 3,039,097 to Strumwasser et al.:

$$\theta = \sin^{-1}\frac{s}{d}\left(\frac{\lambda}{\lambda g}-\frac{\lambda}{\lambda g_o}\right) \qquad (3)$$

or, $$\sin\theta = \frac{\lambda}{d}\left(\frac{\lambda}{\lambda g}-m\right) \qquad (4)$$

where:

$\theta$ = scan angle off the broadside direction
$\lambda$ = free space wavelength of the radiated energy
$\lambda g$ = waveguide wavelength of the radiated energy
$\lambda g_o$ = waveguide wavelength giving a broadside beam
$d$ = center-to-center spacing between adjacent elements of the lineal array
$s$ = incremental feedline length connecting adjacent feedhorn sections of each radiating element
$m = s/\lambda g_o$, an integer number, 0, 1, 2, 3 . . .

In the design of a frequency-scanned array, the length L of the array is a function of the desired beamwidth in the plane of the scanning produced by such array, the larger such dimension the smaller the resulting beamwidth, as is known in the art.

The center-to-center spacing, $d$, between adjacent radiating elements along such length L, determines the number, P, of such elements employed.

$$P = L/d \qquad (5)$$

Because the cost of such an array is directly related to the number, P, of radiating elements, it is clear that such cost tends to vary inversely with the dimension, $d$. Hence, an optimum array design involves maximizing the center-to-center spacing dimension, $d$.

If the spacing, $d$, between the centers of adjacent apertures is too great, then grating lobes, or more than one main lobe, results, each such lobe extending in a mutually exclusive direction. For example, if the spacing, $d$, is too great then at a so-called broadside frequency, $f_o$, not only does a resultant broadside planar wave produce a broadside beam, but the individual wave fronts of the several apertures may provide another combined wave front parallel to the array dimension, resulting in an endfire beam at both +90° and −90° of the broadside direction. As the frequency of the radiated energy is perturbed from the broadside frequency, not only is the first described lobe perturbed from the broadside direction, but the other grating lobes will be similarly perturbed from the end-fire direction. Hence, in order to avoid ambiguities in the determination of the direction of a detected radar target, it is necessary to avoid the generation of grating lobes. Grating lobes may be avoided by limiting the center-to-center spacing, $d$, between adjacent radiating elements of an array in accordance with the following relationship:

$$d_{max.} = \frac{\lambda_{min.}}{1+|\sin\theta_{max.}|} \qquad (6)$$

where:

$\lambda_{min}$ = minimum free space wavelength associated with the maximum frequency of interest
$\theta_{max}$ = maximum scan angle of interest, off broadside Such relationship is taught by Equation 4 on page 54 of an article, "Beamwidth and Directivity of Large Scanning Arrays," by R. S. Elliott, in the December 1963 issue of The Microwave Journal, published by Horizon House, 610 Washington St., Dedham, Mass. (In such reference, the term cos $\theta_o$ is employed rather than sin $\theta_{max}$, because the angle of interest is measured therein from the direction of the array rather than from the broadside direction.) Such relationship is also taught by Equation 11 on page 120 of an article, "Array Antennas," by John L. Allen, in the November 1964 issue of Spectrum, published by the Institute of Electronics and Electrical Engineers. For a maximum angle of interest, $\theta_{max}$ equal to $\mp 90°$ off broadside, Equation 6 above reduces to:

$$d_{max} < \lambda_{min}/2 \qquad (7)$$

In other words, the maximum center-to-center spacing between adjacent elements of a linear array should be less than one-half the free space wavelength associated with the highest frequency to be employed, in order to avoid grating lobes.

From a practical design standpoint it is necessary to satisfy the design condition imposed by both of Equations 3 and 6. If the geometry of the array must provide a broadside wave front at at least one selected frequency the relationship of Equation 3 must be satisfied:

$$\theta = \sin^{-1}\frac{s}{d}\left(\frac{\lambda}{\lambda g}-\frac{\lambda}{\lambda g_o}\right) = \sin^{-1}\frac{\lambda}{d}\left(\frac{s}{\lambda g}-m\right) = 0 \qquad (8)$$

where $m = s/\lambda g_o$.

The condition ($s=0$), while theoretically satisfying the broadside condition, infers a non-frequency-sensitive array of only one aperture (zero spacing between all apertures); and therefore is not a valid solution for the desired spacing dimension of the frequency sensitive linear array intended. In other words, $s=0$ is not a permissible solution.

Now, in the economical and efficient design illustrated in FIGS. 5 and 6, wherein straight feedline sections are employed, crossed relative to mutually contiguous feedhorn sections, the center-to-center spacing, $d$, between adjacent apertures is substantially equal to the incremental feeding dimension, $s$. Because the dimensions $s$ and $d$, are substantially equal, Equation 4 may be rewritten as:

$$\sin\theta = (\lambda/\lambda g - \lambda m/d) \qquad (9)$$

In such arrangement, the broadwall dimension of the contiguous feedhorn sections are also substantially equal to the center-to-center dimension, $d$. Now, the maximum allowable dimension for $d$, and hence for the feedhorn broadwall, may not (from Equation 7), exceed $\lambda_{min}/2$. In other words, $$(\lambda/d) > 2 \tag{10}$$

Also, as a practical matter, the ratio $\lambda/\lambda g$, of the free space wavelength to the corresponding waveguide wavelength (in Equation 9) is approximately 0.7. Therefore, Equation 9 may be further simplified by substituting the numbers 0.7 and 2 for $\lambda/\lambda g$ and $\lambda/d$, respectively:

$$\sin \theta \approx .7 - 2m \tag{11}$$

Because the sine function (e.g., $\sin \theta$ of Equation 11) has an upper limit of unity, it is apparent that an integer value as low as unity for $m$ (in Equation 9) will not satisfy such condition $$|\sin \theta|_{\text{lim}} = \text{unity} \neq .7 - 2 \times 1.0 = -1.3 \tag{12}$$

Accordingly, some value less than unity must be considered for the term, $m = s/\lambda g_0$. It is also recalled that the value for $s$ must be greater than zero in order to infer a frequency-sensitive linear array of mutually spaced elements ($s \neq 0$), and yet permit a broadside beam ($\theta = 0$, at a selected broadside frequency), the coefficient for $m(\lambda/d) > 2$, of Equations 10 and 11) having previously been selected to avoid the phenomenon of grating lobes. Because of the necessity of the in-phase relationship required between the separate wave fronts of each aperture comprising the broadside wave front for a broadside frequency $f_0$, it may be demonstrated that instead of the dimension $s$ being an integer number of waveguide wavelengths, $s = m\lambda g_0$, of the wavelength associated with a broadside frequency, the dimension, $s$, may instead be an odd integer number of waveguide half-wave lengths $$\left(s = \frac{(2n+1)}{2}\lambda g_0\right)$$

where $n$ is an integer number, including zero (thereby producing an anti-phase relationship, $\pi = \lambda g_0/2$, between adjacent radiating elements of the array); and broadband phase-shift means, for providing an incremental anti-phase relationship, inserted between adjacent elements of the array (thereby restoring the mutually in-phase relationship between the separate wave fronts of separate elements or the coplanar broadside wavefront associated with the selected broadside frequency). The phase-shift provided by such means should preferably be substantially constant or insensitive to frequency over the frequency region of interest.

One means of inserting such broadband incremental anti-phase relationship in the relative phase relation between adjacent elements of the linear array of FIGS. 2, 5 and 6 is to provide a 90° or quarter turn twist in the feedhorn of each element, alternate elements being twisted in an alternate elements being twisted in an alternate sense or direction, as illustrated in FIG. 5. Hence, by means of such alternately oppositely twisted 90° turns in the feedhorns, together with the limitation of $$\frac{(2n+1)}{2}\lambda g_0 = s \approx d < \frac{\lambda_{\text{min.}}}{2}$$

the efficient configuration of FIGS. 5 and 6, employing low-cost, straight line microwave sections, may be realized.

Although the upper limit of the sine function (unity) has been employed in treating the limitations on the allowable geometry of the above described device, the maximum scan angle represented by such limit $$(\theta = \sin^{-1} 1.0 = 90°)$$

is of limited significance. As may be readily appreciated, the effective aperture $L'$ provided by an array of length $L$, varies as the cosine of the look angle, $\theta$:

$$L' = L \cos \theta \tag{13}$$

In other words, the effective antenna aperture is reduced, as the look angle increases, the theoretical aperture $L'$ at 90° off broadside being zero. Because the effective aperture $L'$ decreases as $\theta$ increases, the beamwidth increases (e.g., the directive properties of the beam deteriorate with increasing look angle). Because the beamwidth is not highly directive in such regions, there is no reason to attempt frequency scanning of the beamwidth in such regions, referred to in the art as end-fire regions. For this reason, in practical cases the maximum scan angle, $\theta_{\text{max}}$, is limited to 60° or 70° off broadside.

Figure 8:
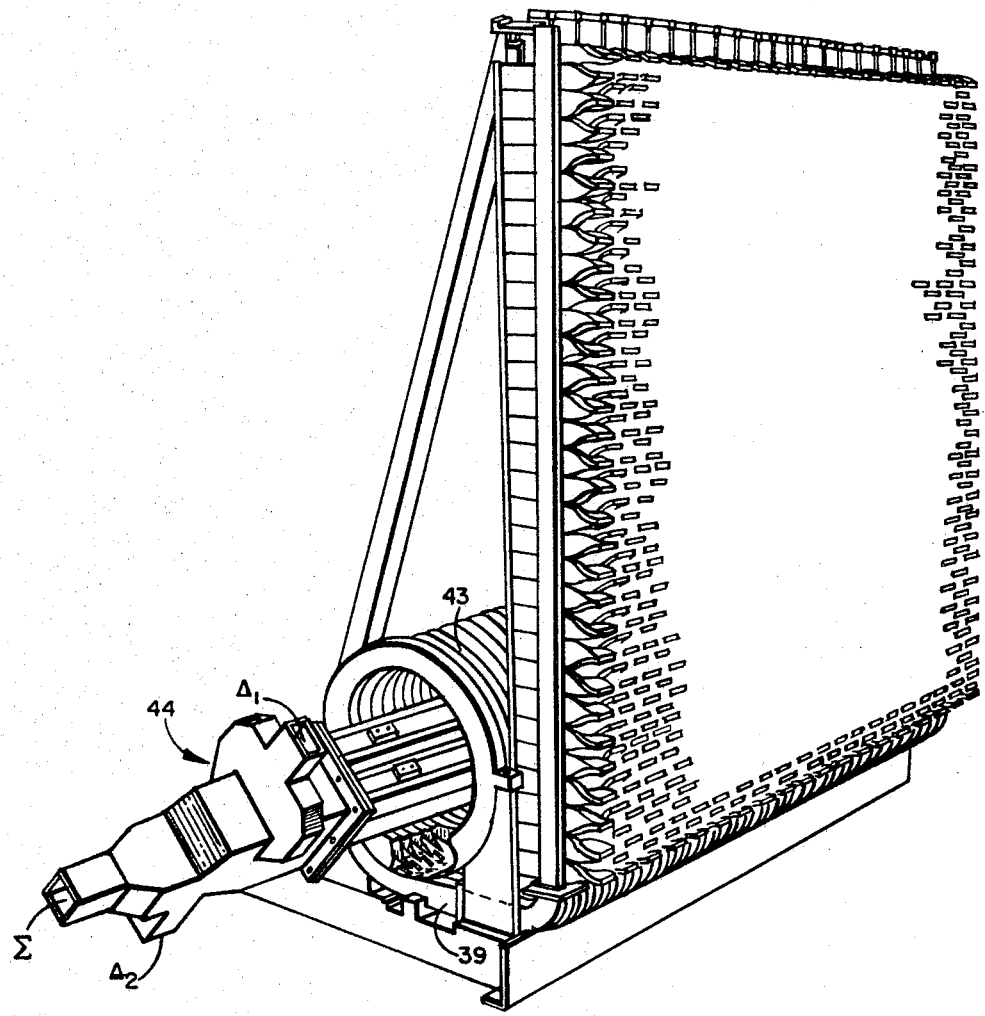
FIG. 8 is an illustration of a preferred embodiment of the schematic arrangement of FIG. 7.

A preferred embodiment of the schematic dual-plane scanning, dual-plane monopulse arrangement of FIG. 7, and employing the efficient, low-cost linear array arrangement of FIGS. 5 and 6, is shown in FIG. 8.

In the arrangement of FIG. 8, the two pairs of feedlines corresponding to feedlines 121A, 121B, 122A and 122B of FIG. 7 are provided by an assembly 43 of four quadrifilar-wound helices, each coupled to an appropriate one of the mutually phase-squinted feedlines associated with each of the parallel-stacked linear arrays of radiating elements. Such coupling is provided by a plurality of directional couplers comprising coupling means 39.

The mutually phase-squinted property required of the two pairs of helices may be obtained by employing a different radial depth for the second helix of each of the two helix pairs. Because the radial dimension of the illustrated helices corresponds to a broadwall waveguide dimension thereof, varying such radial dimension varies the effective broadwall dimension and thus varies the phase velocity therethrough. Hence, by thus varying the phase velocity of one helix relative to another, such bifilar-wound or quadrifilar-wound helices are caused to become mutually phase-squinted.

A four-horn monopulse feed horn 44 may then be connected to the four terminals A, B, C and D of the device of FIG. 8, such terminals corresponding to the like referenced terminals of FIG. 7. Feedhorn 44, corresponding to the hybrid junction elements 26, 27, 28 and 29 of FIG. 7, may, for example, be constructed in accordance with the teachings of U.S. Patent No. 2,956,275 issued October 11, 1960, to R. M. Ashby for a Duomode Monopulse Radar System.

Accordingly, it is to be appreciated that an improved antenna has been described, having both dual-plane monopulse and frequency-sensitive dual-plane scanning properties. By the use of a pair of mutually phase-squinted feedlines in cooperation with a single linear array of radiating elements, both frequency scanning and a monopulse mode are provided parallel to a common plane of interest. Further, by employing a selected dimension for both the broadwall dimensions and the maximum spacing between adjacent apertures of the parallel stacked linear arrays of apertures utilized, together with the broad-band anti-phase shift means provided between adjacent apertures, then low-cost, efficient straight-line waveguide sections may be employed in the construction of the parallel stacked linear arrays employed. Moreover, the use of quadrifilar-wound helices provides an efficient, low-cost helix assembly for the cooperative interconnection of the parallel-stacked linear arrays comprising the antenna.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A doubly frequency-dispersive monopulse antenna comprising
    a coplanar matrix of radiating elements comprising a plurality of parallel-stacked linear arrays of radiating elements;
    at least a pair of bifilar-wound helix delay lines each connected in microwave circuit at regular intervals to a successive one of said linear arrays; and
    sum-and-difference combining means coupled to said helix lines.

2. The device of claim 1 in which said helix lines are mutually phase-squinted.

3. The device of claim 1 in which each radiating element of each of said linear arrays includes a radiating feedhorn section, each feedhorn section having a quarter-turn twist, adjacent feedhorn sections being oppositely twisted.

4. A doubly frequency-dispersive antenna comprising
a coplanar matrix of radiating elements comprising a plurality of parallel-stacked linear arrays of radiating elements,
each linear array including a pair of mutually phase squinted straight-line feedguides, each of the radiating elements of each of said arrays including a radiating feedhorn section having a quarter turn twist, adjacent feedhorn sections being oppositely twisted; and
at least a pair of bifilar-wound helix delay lines each connected in microwave circuit at regular intervals to a successive one of said linear arrays by a mutually exclusive one of the mutually phase-squinted straight-line feedguides.

5. A frequency-controlled dual plane scanning, dual plane monopulse antenna comprising
a co-planar matrix of uniformly-spaced rows and columns of radiating elements,
a like number of first pair of mutually progressively phase-squinted feedlines as rows,
each pair of feedlines connected to feed a mutually exclusive one of said rows of radiating elements
a second and third pair of feedlines, said third pair being progressively phase squinted relative to said second pair, a first feedline of each of said second and third pairs being connected to a corresponding feedline of each of said first pairs of feedlines, and a second feedline of each of said second and third pairs being connected to the second feedline of each of said first pairs of feedlines.

6. A frequency-controlled dual-plane scanning, dual-plane monopulse antenna comprising
a co-planar matrix of uniformly-spaced rows and columns of radiating elements,
a like number of first pairs of mutually progressively phase-squinted feedlines as rows,
each pair of feedlines connected to feed a mutually exclusive one of said rows of radiating elements
a second and third pair of feedlines, said third pair being progressively phase squinted relative to said second pair, a first feedline of each of said second and third pairs being connected to a corresponding feedline of each of said first pairs of feedlines, and a second feedline of each of said second and third pairs being connected to the second feedline of each of said first pairs of feedlines;
first and second sum-and-difference means operatively connected to a respective second and third pair of feedlines;
third sum-and-difference means responsive to said sum channel outputs of said first and second sum-and-difference means for providing a monopulse sum signal and first monopulse difference signal; and
signal combining means responsive to the difference channel outputs of said first and second sum-and-difference means for providing a second monopulse difference signal.

7. A doubly frequency-dispersive, dual-plane monopulse antenna comprising
a coplanar matrix of radiating elements comprising a plurality of parallel-stacked linear arrays of radiating elements, each linear array including a pair of mutually phase-squinted feedlines,
two pair of quadrifilar-wound helix delay lines, a first delay line of each pair being connected in microwave circuit at regular intervals to a first feedline of successive one of said arrays, a second delay line of each pair being connected in microwave circuit at regular intervals to a second feedline of a successive one of said arrays, said first delay lines of said first and second pairs of delay lines being mutually phase squinted, and said second delay lines of said first and second pairs of delay lines being similarly phase squinted as said first lines of said two pairs.

8. A frequency-controlled dual plane scanning, dual-plane, monopulse antenna assembly comprising
a plurality of mutually parallel lineal physical arrays of uniformly spaced radiating elements, said array of elements forming a coplanar matrix, each array fed by two separate mutually phase-squinted straight line feedlines for generating two mutually angularly squinted radiation patterns, squinted in a plane containing such linear array, in which $$\left(\frac{2n+1}{2}\right)\lambda g_o S \approx d < \lambda_{\min.}/2$$

where:

$n$ = an integer
$S$ = incremental feedline length between adjacent elements of a linear array
$d$ = uniform center-to-center spacing between adjacent elements of a linear array
$\lambda g_o$ = waveguide wavelength at the broadside frequency
$\lambda_{\min.}$ = minimum free space wavelength associated with the maximum frequency of interest;
each of the radiating elements of each of said arrays including a radiating feedhorn section having a quarter turn twist, adjacent feedhorn sections being oppositely twisted; and
four quadrifilar-wound helices forming two pairs of helices, each pair having a phase velocity differing from the other pair, a helix of each helix pair being coupled as a feedline to a like one of the two straight line feedlines of each lineal array.

9. A frequency-controlled dual plane scanning, dual-plane, monopulse antenna assembly, comprising
a plurality of two mutually parallel lineal physical arrays
of uniformly spaced radiating elements, said array of elements forming a coplanar matrix, each array fed by two separate mutually phase-squinted straight line feedlines for generating two mutually angularly squinted radiation patterns, squinted in a plane containing such linear array, in which $$(2n+1/2)\lambda g_o = S \approx d < \lambda_{\min/2}$$

where:

$n$ = an integer
$S$ = incremental feedlines length between adjacent elements of a linear array
$d$ = uniform center-to-center spacing between adjacent elements of a linear array
$\lambda g_o$ = waveguide wavelength at the broadside frequency
$\lambda_{\min}$ = minimum free space wavelength associated with the maximum frequency of interest;

four quadrifilar-wound helices forming two pairs of helices, each pair having a phase velocity differing from the other pair, a helix of each helix pair being coupled as a feedline to a like one of the two straight line feedlines of each lineal array;
first and second sum-and-difference means respectively operatively connected to a respective first and second helix pair of said quadrafilar wound helices;
third sum-and-difference means responsive to the sum channel outputs of said first and second sum-and-difference means; and
signal combining means responsive to the difference channel outputs of said first and second sum-and-difference means.

References Cited

UNITED STATES PATENTS

| | | | |
|---|---|---|---|
| 2,540,839 | 2/1951 | Southworth | 343—778 |
| 2,831,190 | 4/1958 | Trinter | 343—854 |
| 2,967,301 | 1/1961 | Rearwin | 343—771 |
| 3,137,856 | 6/1964 | Tashjian | 343—771 |
| 3,176,297 | 3/1965 | Forsberg | 343—100.6 |
| 3,192,530 | 6/1965 | Small | 343—854 |
| 3,214,755 | 10/1965 | Blass et al. | 343—778 X |
| 3,275,952 | 9/1966 | Korman | 343—778 X |
| 3,281,851 | 10/1966 | Goebels | 343—771 X |
| 3,308,456 | 3/1967 | Levenson et al. | 343—100.6 X |
| 3,308,465 | 3/1967 | Tamama | 343—100.6 |
| 2,436,380 | 2/1948 | Cutler | 343—778 X |
| 3,382,502 | 5/1968 | Bouix | 343—777 |

OTHER REFERENCES

Croney, J., "Doubly Dispersive Frequency Scanning Antenna (for two plane scanning)," Microwave Journal, July 1963, pp. 76–80.

Multidirectional Antenna, a New Approach to Stacked Beams, Judd Blass, IRE Natl. Conv. Record, PT–1, 1960.

HERMAN KARL SAALBACH, *Primary Examiner.*

W. H. PUNTER, *Assistant Examiner.*

U.S. Cl. X.R.

343—100, 768, 786, 854